(12) United States Patent
Oh et al.

(10) Patent No.: US 7,009,593 B2
(45) Date of Patent: *Mar. 7, 2006

(54) LIQUID CRYSTAL DISPLAY DEVICE HAVING A DIGITIZER

(75) Inventors: Young-Jin Oh, Kyonggi-do (KR); Yun-Cheol Jeong, Seoul (KR); Young-Soo Ahn, Anyang (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/682,912

(22) Filed: Oct. 14, 2003

(65) Prior Publication Data

US 2004/0080678 A1   Apr. 29, 2004

Related U.S. Application Data

(63) Continuation of application No. 09/598,606, filed on Jun. 21, 2000, now Pat. No. 6,661,399.

(30) Foreign Application Priority Data

Jun. 21, 1999   (KR) .............................. 1999-23168

(51) Int. Cl.
  *G09G 3/36*   (2006.01)
  *G09G 5/00*   (2006.01)
(52) U.S. Cl. ......................................... 345/87; 345/174
(58) Field of Classification Search ............ 345/87–98, 345/173–179; 178/18.01–18.07, 19.01–19.06, 178/20.01–20.02
See application file for complete search history.

(56) References Cited

U.S. PATENT DOCUMENTS

| 5,657,054 A |   | 8/1997 | Files et al. |
| 5,677,711 A | * | 10/1997 | Kuo ........................... 345/173 |
| 5,764,216 A |   | 6/1998 | Tanaka et al. |
| 6,239,788 B1 | * | 5/2001 | Nohno et al. ............... 345/173 |
| 6,661,399 B1 | * | 12/2003 | Oh et al. ..................... 345/87 |

FOREIGN PATENT DOCUMENTS

| JP | 03-296127 | 12/1991 |
| JP | 10-011204 | 1/1998 |

* cited by examiner

*Primary Examiner*—Vijay Shankar
(74) *Attorney, Agent, or Firm*—McKenna Long & Aldridge LLP (57) ABSTRACT

The present invention discloses a first frame, a liquid crystal panel supported by the first frame, the liquid crystal panel having a display region and a side wall portion, a digitizer located on the liquid crystal panel, the digitizer having a peripheral portion, and a second frame having a front surface with an opening region and a side wall portion, the front surface pressurizing the peripheral portion of the digitizer, the opening region formed at a location corresponding to the display region of the liquid crystal panel.

19 Claims, 7 Drawing Sheets

(RELATED ART)

FIG. 3

(RELATED ART)

# LIQUID CRYSTAL DISPLAY DEVICE HAVING A DIGITIZER

CROSS REFERENCE

This application is a continuation of prior application Ser. No. 09/598,606, filed Jun. 21, 2000, now U.S. Pat. No. 6,661,399.

This application claims the benefit of Korean Patent Application No. 1999-23168, filed on Jun. 21, 1999, under 35 U.S.C. § 119, the entirety of which is hereby incorporated by reference.

BACKGROUND OF THE INVENTION

1. Field of the Invention

The present invention relates to a liquid crystal display (LCD) device, and more particularly, to a liquid crystal display device having a digitizer.

2. Description of Related Art

Liquid crystal display (LCD) panels are used in many electronic data handling devices, including lap-top computers, personal digital assistants, personal organizers, and point-of-sale terminals. These flat panel display systems typically incorporate the capability of inputting information directly onto the display screen by pointing or writing with a finger or a non-inking pen. For example, a finger may be used to push a "soft" button that is displayed on the screen or a non-inking stylus can be used to sign one's name and have it captured and displayed electronically.

Figure 1:
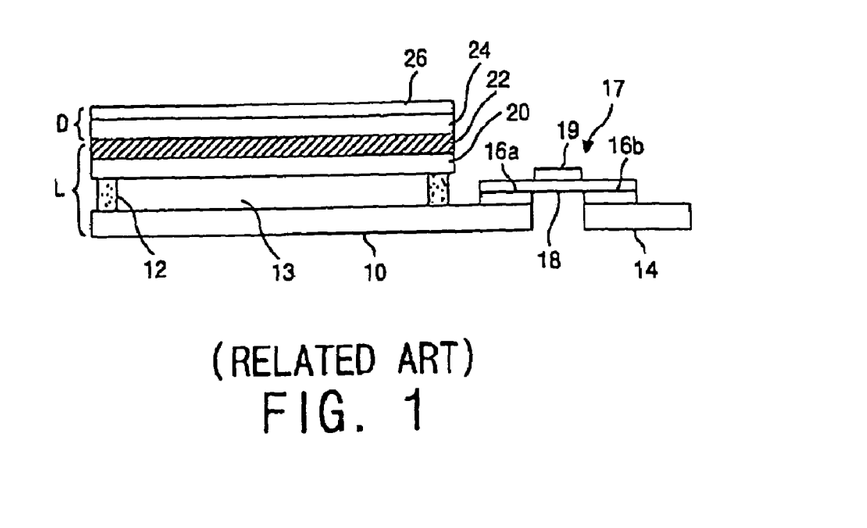
FIG. 1 is a schematic sectional view showing a LCD device having a digitizer according to a related art.

A typical LCD panel, as shown in FIG. 1, comprises a liquid crystal display (LCD) module "L" and a digitizer "D". The LCD module "L" has lower and upper substrates 10 and 20 with a liquid crystal layer 13 interposed therebetween. The lower substrate 10 has switching elements (not shown) such as thin film transistors (TFTs), and the upper substrate 20 has a common electrode, color filter and black matrix. A linear polarizer 22 is located on the upper substrate. The two lower and upper substrates 10 and 20 are sealed by a sealant 12, thus preventing leakage of the liquid crystal. Further, pads (not shown) patterned on the lower substrate 10 are electrically coupled to a printed circuit board (PCB) 14 through a TCP (tape carrier package) 17 having a film 18 where a drive integrated circuit (IC) 19 is mounted. Pads (not shown) on the lower substrate 10 and output signal lines of the film 18 are electrically connected with anisotropic conductive film 16a, and signal lines of the PCB 14 and input lines of the film 18 are electrically connected with anisotropic conductive film 16b.

Figure 2:
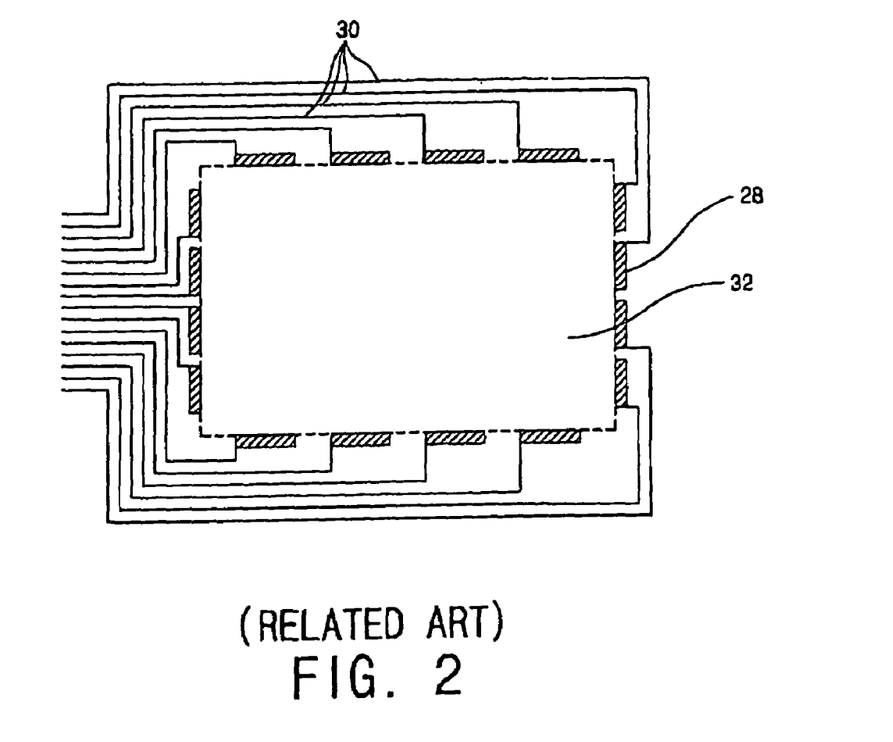
FIG. 2 is a plan view of a lower plate of the digitizer of FIG. 1.

Further, the digitizer "D" as a location-sensing component has first and second plates 24 and 26 and a drive circuit 25 (see FIG. 4), and the two plates 24 and 26 serve to produce or detect signals indicative of the location of a pen, a finger or other input devices. Each of the two plates 24 and 26, even though not shown, has a substrate, a transparent electrode and a metal pattern layer, which are stacked in the above-described order. Further, as shown in FIG. 2 which is a plan view of the first plate 24 of the digitizer "D", the first plate 24 of the digitizer "D" has a plurality of digitizer electrodes 28 formed along the edges of an active region 32 and regularly spaced apart from each other. The digitizer electrodes 28 are connected to an external digitizer drive circuit (not shown). The active region 32 is a location sensing region and has a resistive layer in the form of a strip or a grid.

Figure 3:
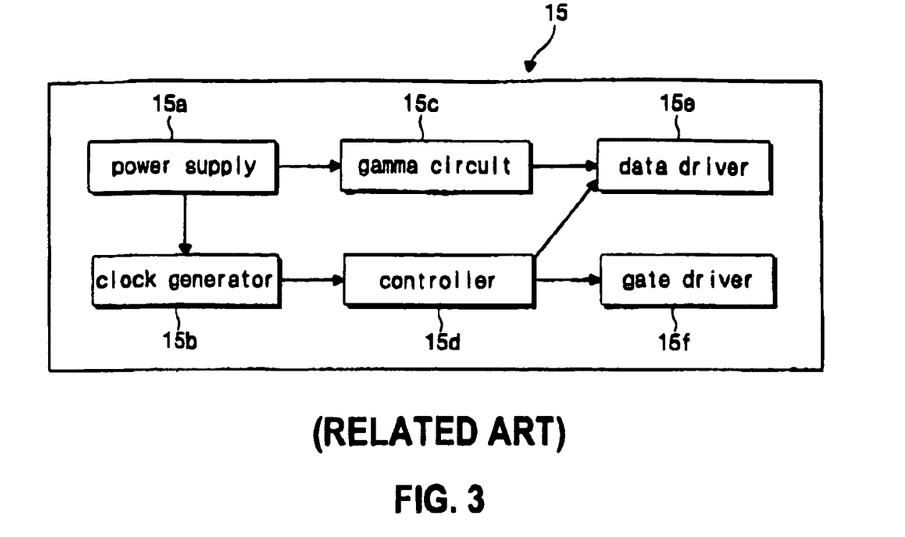
FIG. 3 is a block diagram of a drive circuit of the LCD device of FIG. 1.
Figure 4:
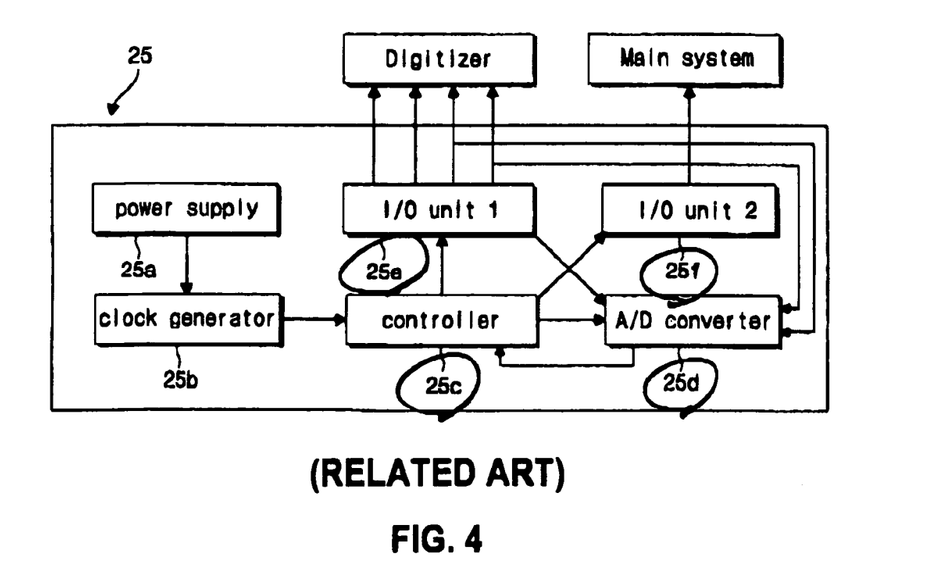
FIG. 4 is a block diagram of a drive circuit of the digitizer of FIG. 1.

Further, the drive circuit 15 for the LCD module "L", as shown in FIG. 3, comprises a power supply 15a for supplying a voltage, a clock generator 15b for producing clock signals to drive the LCD device, a gamma circuit 15c for collecting a gamma characteristic of the LCD device, a controller 15d for controlling all components of the LCD module "L", and data and gate drivers 15e and 15f for producing images. Further, the drive circuit 25 for the digitizer "D", as shown in FIG. 4, comprises a power supply 25a for supplying a voltage, a clock generator 25b for producing clock signals to drive the digitizer, a controller 25c for controlling all components of the digitizer "D", and an analog to digital (A/D) converter 25d for converting analog signals to digital signals, an input/output (I/O) unit 1 25e for conveying analog signals from the digitizer to the A/D converter 25f and conveying signals from the controller 25d to the digitizer, and an input/output (I/O) unit 2 25e for transferring digital signals in the form of x and y coordinate values from the A/D converter 25f to a main system of the device having the LCD device such as notebook computer by the controller 25d.

However, the LCD panel described above has the following disadvantages. First, as shown in FIG. 2, since a plurality of wires 30 are directed toward just one direction for connection with the external drive circuit 25, each wires 30 differs in length, thereby causing different RC delays. Secondly, as shown in FIGS. 3 and 4, the digitizer "D" and the liquid crystal display module "L" use different drive circuit boards 14 and 25 even though they have the same elements such as a power supply, controller and clock generator, whereupon a production cost of the LCD device with digitizer is very high and it is also very difficult to achieve a compact LCD panel.

SUMMARY OF THE INVENTION

To overcome the problems described above, preferred embodiments of the present invention provide a liquid crystal display (LCD) device having a digitizer in which a drive circuit for the digitizer is integrated with a drive circuit for the LCD device.

Another object of the present invention is to provide a compact LCD device.

Another object of the present invention is to provide a low cost LCD device.

In order to achieve the above objects, the present invention provides a liquid crystal display device having a digitizer, including: a first frame; a liquid crystal panel supported by the first frame, the liquid crystal panel having a display region and a side wall portion; a digitizer located on the liquid crystal panel, the digitizer having a peripheral portion; and a second frame having a front surface with an opening region and a side wall portion, the front surface pressurizing the peripheral portion of the digitizer, the opening region formed at a location corresponding to the display region of the liquid crystal panel.

The liquid crystal display device of the present invention further includes a printed circuit board having a drive circuit, the drive circuit driving the digitizer; and a first connection electrically connecting the printed circuit board with the digitizer, the first connection passing between the side wall portion of the liquid crystal panel and the side wall portion of the second frame.

The liquid crystal display device further includes a printed circuit board located on a back surface of the first frame, the printed circuit board having a controlling circuit for controlling both the liquid crystal panel and the digitizer.

The digitizer includes a plurality of digitizer electrodes covered by the front surface.

The present invention also provides a liquid crystal display device used by a main system, including: a digitizer for producing signals indicative of a location by an external input and driven according to a first clock generated by a first clock generator; a liquid crystal display device for displaying a predetermined information according to the signal from the digitizer, the liquid crystal display device having first and second substrates with a liquid crystal layer interposed therebetween, and data and gate lines; and a printed circuit board having a controlling circuit for controlling the digitizer and the liquid crystal display.

The drive circuit includes a power supply for supplying a voltage to the LCD panel and the digitizer; a clock generator for producing clock signals to drive the LCD device and the digitizer; an analog to digital (A/D) converter for converting analog signals to digital signals; a gamma circuit for correcting gamma characteristics of the LCD device; a first input/output (I/O) unit for conveying analog signals from the digitizer to the A/D converter and conveying signals from the controller to the digitizer; a second input/output (I/O) unit for transferring digital signals in the form of x-y coordinate values from the A/D converter to the main system; data and gate drivers driven by the clock generator; and a controller for controlling all components of the drive circuit.

The first I/O unit is one of a serial port, a parallel port, a universal serial bus (USB), and IEEE 1394 bus.

The digitizer includes a) a first digitizer substrate having a rectangular shape over the upper substrate of the liquid crystal display device; b) a second digitizer substrate having a rectangular shape over the first digitizer substrate; c) a protective layer on the second digitizer substrate, d) first two digitizer electrodes disposed parallel to each other and along opposite edges of the first digitizer substrate; d) second two digitizer electrodes disposed parallel to each other and along opposite edges of the second digitizer substrate, the second two digitizer electrodes perpendicular to the first two digitizer electrodes, e) first and second drive circuit boards for driving the first and second digitizer electrodes, each boards disposed along neighboring edges of the first and second transparent conductive layers, and f) electric connections for connecting the first and second drive circuit boards to the corresponding digitizer electrodes, the electric connections having the same length.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 5A:
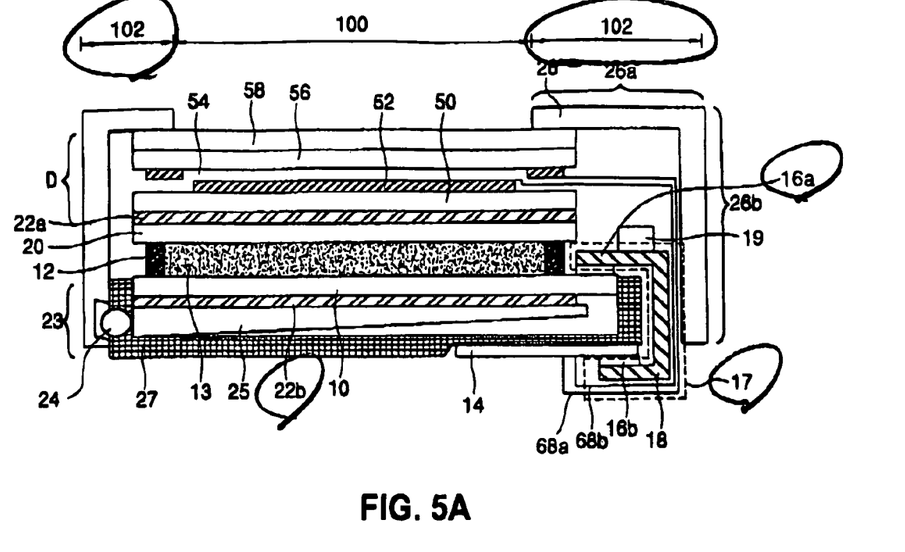
FIG. 5A is a schematic cross-sectional view showing a LCD device having a resistive type digitizer according to a first embodiment of the invention.

FIG. 5A is a schematic cross-sectional view illustrating a liquid crystal display (LCD) device having a resistive digitizer according to a first embodiment of the present invention. As shown in FIG. 5A, the inventive LCD device having the resistive digitizer comprises a liquid crystal panel and the resistive type digitizer "D". The liquid crystal panel includes lower and upper substrates 10 and 20 with a liquid crystal layer 13 interposed therebetween. The lower substrate 10 has switching elements (not shown) such as thin film transistors (TFTs) and the upper substrate has a black matrix and color filter layers (not shown). Further, upper and lower polarizers 22a and 22b are located on the upper and lower substrates 10 and 20, respectively. The two lower and upper substrates 10 and 20 are sealed by a sealant 12, thus preventing leakage of the liquid crystal. The liquid crystal panel further includes a back light device 23 having a lamp 24 and a light wave-guide plate 25. The inventive LCD device having the resistive type digitizer further has first and second frames 26 and 27. The first frame 26 has substantially a rectangular shape and an opening portion corresponding to the display region 100 of the LCD device. The first frame 26 has front surface and side wall portion (26b). The front surface has the opening portion and front peripheral surface portion (26a) around the opening portion, and side wall portion (26b) which is perpendicular to the front surface. The front peripheral surface portion (26a) overlaps a non-display region 102 of the LCD device sufficiently to pressurize the digitizer "D", and covers digitizer electrodes which are formed on the peripheral region of the digitizer. By covering the digitizer electrodes with the first frame, noise influence to the digitizer can be reduced. The second frame 27 serves to support the liquid crystal panel. Thus, the liquid crystal panel and the digitizer "D" are held by the first and second frames 26 and 27 when assembled. The first frame 26 is made of a metal, and the second frame 27 is made of a plastic material.

A printed circuit board (PCB) 14 is located on the rear surface of the second frame 27. The pads (not shown) of the lower substrate are connected with a printed circuit board (PCB) 14 through a TCP 17 having a film 18 where a drive integrated circuit (IC) chip 19 is mounted. Between the lower substrate 10 and the film 18 is located an anisotropic conductive film 16a and between the PCB 14 and the film 18 is an anisotropic conductive film 16b. The PCB 14 includes a gate PCB 60 and a data PCB 62 which are respectively connected to the data or gate pads (not shown) patterned on the lower substrate through a gate TCP 64 and a data TCP 66 (see FIG. 7). The first and second polarizers 22a and 22b are located on the upper substrate 20 and the lower substrate 10 respectively.

Further, the digitizer "D" has first and second digitizer substrates 50 and 56, and a protective layer 58, which are stacked in the above-described order. The first digitizer substrate 50 has a digitizer pattern on its front surface 50a, and the second digitizer substrate 56 also has a digitizer pattern on its bottom surface 56a. The digitizer patterns may have a grid shape, a strip shape or a rectangular shape. In case of the rectangular shaped conductive layer, it is preferred that the conductive layer is transparent.

Figure 6A:
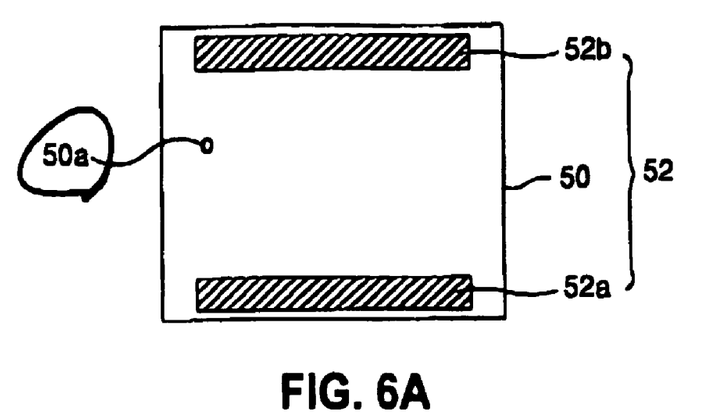
FIGS. 6A and 6B are plan views illustrating arrangement of digitizer electrodes of the resistive type digitizer according to the first embodiment of the present invention.
Figure 6B:
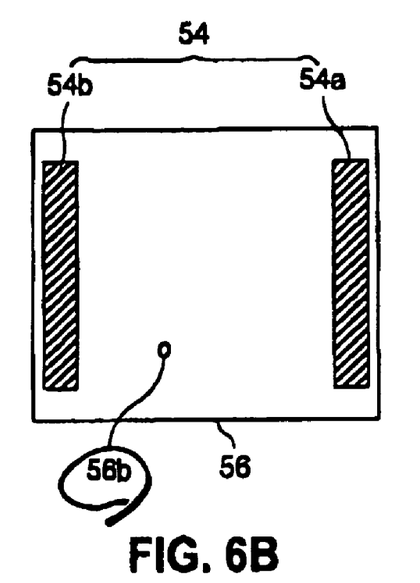

The first digitizer substrate 50 preferably has first digitizer electrodes 52a and 52b arranged on its front surface and spaced apart from each other, and the second digitizer substrate 56 preferably has two second digitizer electrodes 54a and 54b arranged on its bottom surface and spaced apart from each other. As shown in FIGS. 6A and 6B, the first digitizer electrodes 52 (52a and 52b) of a bar shape are arranged in a transverse direction and the second digitizer electrodes 54 (54a and 54b) of a bar shape are arranged in a longitudinal direction perpendicular to the first digitizer electrode 52 so that the digitizer electrodes 52 and 54 substantially forms a rectangular shape when the first and second digitizer substrates 50 and 56 are aligned. The first and second digitizer electrodes 52 and 54 are electrically connected to the corresponding digitizer pattern. Resistive of digitizer electrodes 52 and 54 is lower than the digitizer pattern.

Figure 7:
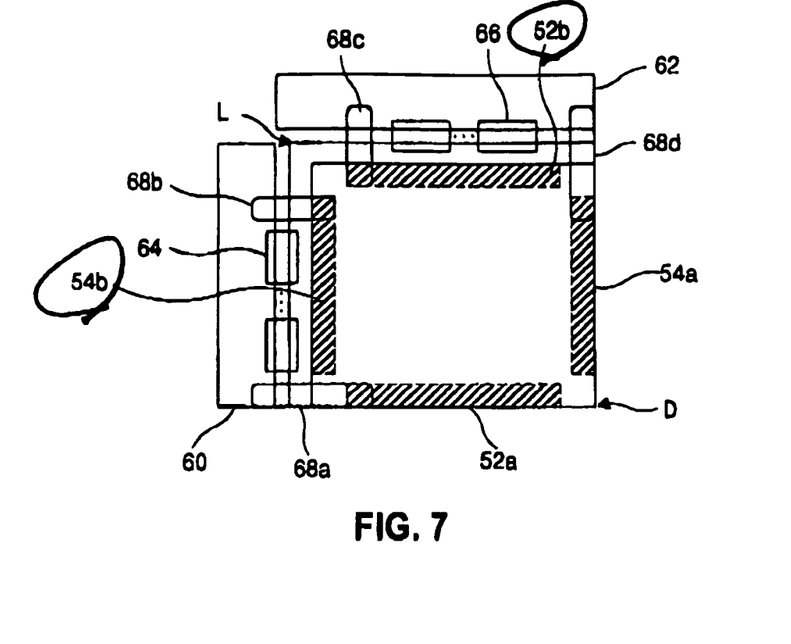
FIG. 7 is plan views of the LCD device having the resistive type digitizer.

FIG. 7 shows the LCD device when the first and second digitizer substrates 50 and 56 of the digitizer "D" are aligned. As shown in FIG. 7, the digitizer "D" is arranged over the upper substrate 22 of the LCD panel and, the first digitizer electrode 52a and the second digitizer electrode 54b are electrically connected with a digitizer drive circuit (not shown). The digitizer drive circuit is mounted on the gate and/or date PCB 60 and 62. In other words, the first digitizer electrode 52a and the second digitizer electrode 54b are connected with the digitizer drive circuit on the gate PCB 60 through first and second connections 68a and 68b respectively, and the first digitizer electrode 52b and the second digitizer electrode 54a are electrically connected with the digitizer drive circuit on the data PCB 62 through third and fourth connections 68c and 68d respectively. Therefore, all connections 68a, 68b, 68c and 68d are same in length, thereby preventing different RC delay. As a result, the LCD drive circuit and the digitizer drive circuit can use the same PCBs 60 and 62, leading to a low-cost and compact LCD device. The first to fourth connections 68a, 68b, 68c and 68d are preferably made of a flexible printed cable (FPC). Alternatively, the gate and data PCBs 60 and 62 can be connected with the four digitizer electrodes directly using a wire-bonding method or a soldering method without any connections. In case of using connections 68a, 68b, 68c and 68d, the connections are covered with the first frame 26 made of a metal (see FIGS. 5A and 5B), that is, the connections are electrically shielded by the first frame made of a metal. Therefore, electrical signals of the connections are not affected from electromagnetic interference or external electrical noises, thereby causing precious coordinate detection of locations of a stylus or a finger. The connections 68a, 68b, 68c and 68d are protected from physical impacts, thereby causing a long life span.

Figure 5B:
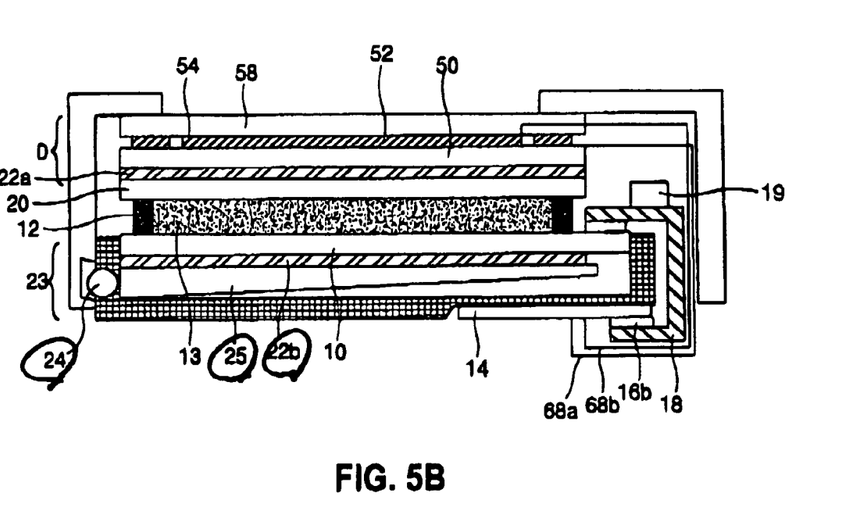
FIG. 5B is a schematic cross-sectional view showing a LCD device having a coupling capacitive type digitizer according to a second embodiment of the invention.
Figure 8:
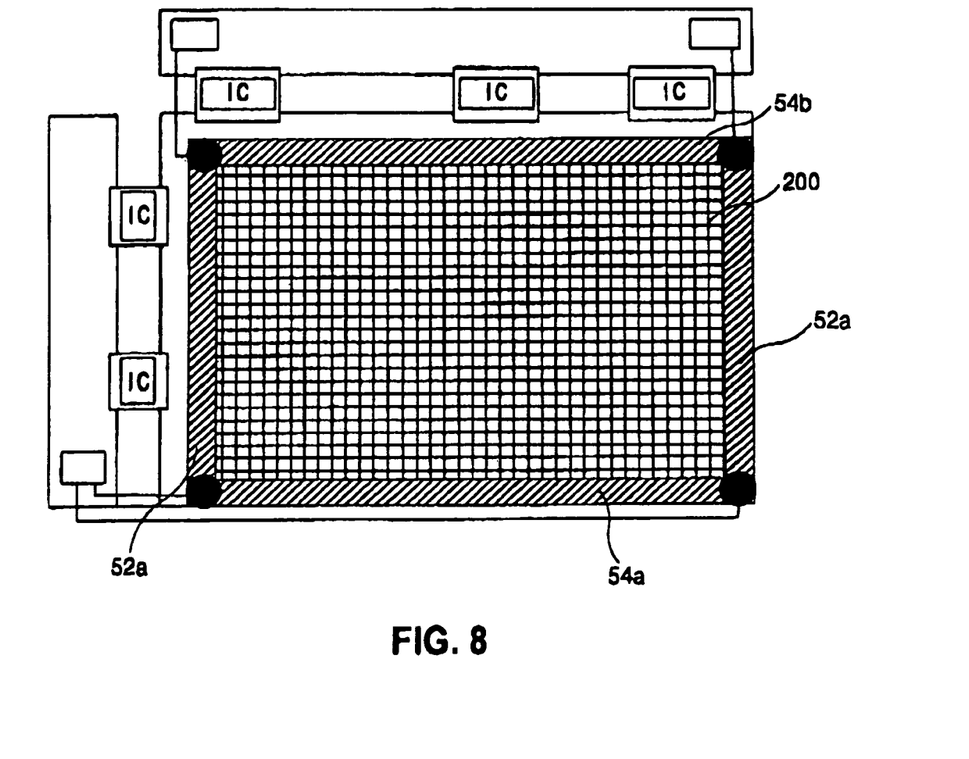
FIG. 8 is plan views of the LCD device having the coupling capacitive type digitizer.

FIGS. 5B and 8 show the LCD device having the coupling capacitive type digitizer according to the second embodiment of the present invention. With compared to the LCD device having the resistive type digitizer, the LCD device having the coupling capacitive type digitizer has a different configuration. In other words, as shown in FIGS. 5B and 8, a digitizer pattern 200 and first and second digitizer electrodes 52 and 54 are arranged on the same substrate, i.e., a digitizer substrate 52. The digitizer pattern 200 may have a grid shape, a strip shape or a big rectangular shape of higher resistance than the digitizer electrodes. As same in the first embodiment, The front peripheral surface portion overlaps a non-display region of the LCD device sufficiently to pressurize the digitizer "D", and covers digitizer electrodes which are formed on the peripheral region of the digitizer so as to use whole opening region of the first frame as coordinate detection and image display area. And by covering the digitizer electrodes with the first frame, noise influence to the digitizer can be reduced. In case of rectangular shaped pattern, it is preferred that the rectangular pattern is transparent. Other configurations and connections between the digitizer and the digitizer drive circuit are the same as those of FIGS. 5A and 7, and thus are omitted.

Figure 9:
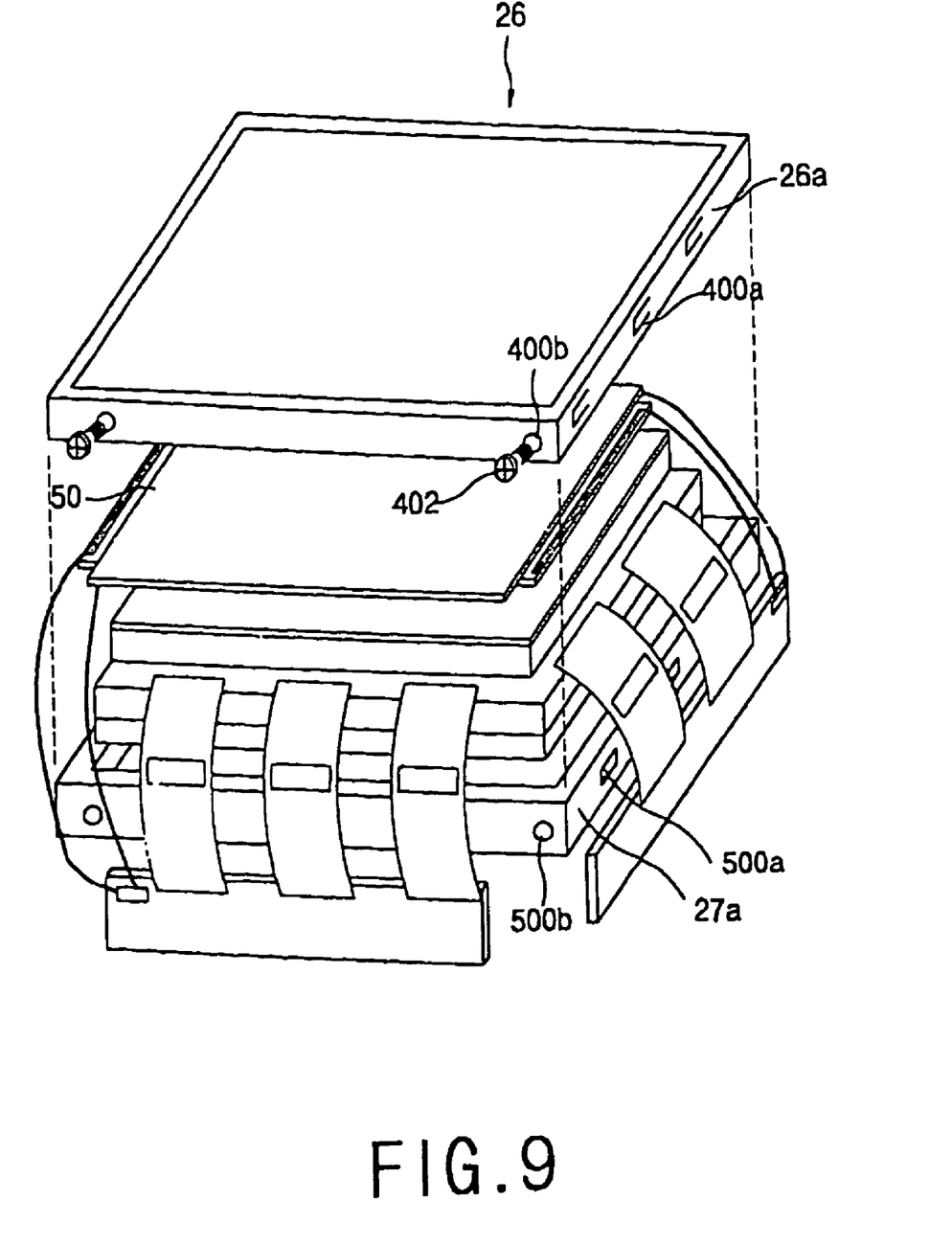
FIG. 9 is a perspective view illustrating the LCD device with the digitizer according to the preferred embodiments of the present invention.

FIG. 9 shows a method of holding the liquid crystal panel and the digitizer using the first and second frames 26 and 27. As shown in FIG. 9, the first frame 26 has bendable portions 400a formed at its side wall 26a, and the second frame 27 has recess portions 500a formed at locations of its side wall 27a corresponding to the bendable portion 400a. Therefore, when the first frame 26 is pressurized to be assembled with the second frame 27 and the bendable portion 400a of the first frame 26 is bent inwardly toward the recess portion 500a of the second frame 27, the liquid crystal panel and the digitizer are held tightly by the first and second frames 26 and 27. Further, instead of the corresponding bendable and recess portions 400a and 500a, a coupling members such as nails or screws can be used to hold the liquid crystal panel and the digitizer. In this case, it is preferred that the first frame 26 has through holes 400b and the second frame 27 has screw holes 500b. Therefore, when the first frame 26 is pressurized to be assembled with the second frame 27 and screws 402 is tightened into the screw holes 500b through the through holes 400b, the liquid crystal panel and the digitizer are held by the first and second frames 26 and 27 tightly.

Figure 10:
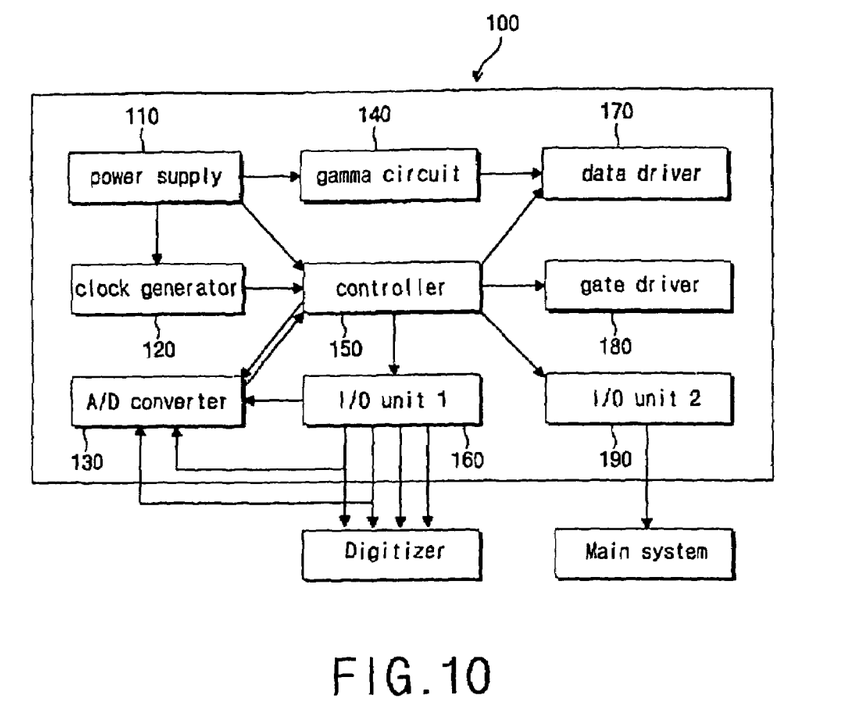
FIG. 10 is a block diagram of a drive circuit according to the preferred embodiments of the present invention.

FIG. 10 is a block diagram illustrating the drive circuit according to the preferred embodiments of the present invention. The inventive drive circuit 100 drives both the LCD module "L" and the digitizer "D". The inventive drive circuit 100, as shown in FIG. 8, comprises a power supply 110 for supplying a voltage to all components of the LCD panel and the digitizer, a clock generator 120 for producing clock signals to drive the LCD device and the digitizer, an analog to digital (A/D) converter 130 for converting analog signals to digital signals, a gamma circuit 140 for correcting gamma characteristics of the LCD device, a controller 150 for controlling all components of the drive circuit 100, an input/output (I/O) unit 1 160 for conveying analog signals from the digitizer to the A/D converter 25f and conveying signals from the controller 25d to the digitizer, a data driver 170 for driving data lines, a gate driver 180 for driving a gate lines, and an input/output (I/O) unit 2 190 for transferring digital signals in the form of x and y coordinate values from the A/D converter 130 to a main system of the device having the LCD device such as a notebook computer by the controller 150. At this time, the I/O unit 1 160 can be one of a serial port, a parallel port, a universal serial bus (USB), and IEEE 1394 bus.

The digitizer "D" of the drive circuit 100 according to the preferred embodiment of the present invention is driven as follows. When voltage from the power supply 110 is applied to digitizer electrodes of the digitizer through the controller 150 and the I/O unit 1 160, analog signals indicative to location of a stylus or a finger are conveyed to the A/D converter 130. Then, digital signals are transferred from the A/D converter 130 to the controller 150. The digital signals are also conveyed to the I/O unit 2 190 in the form of coordinate values by the controller 150 and finally conveyed to the main system of the device having the LCD device such as the notebook computer.

Figure 11:
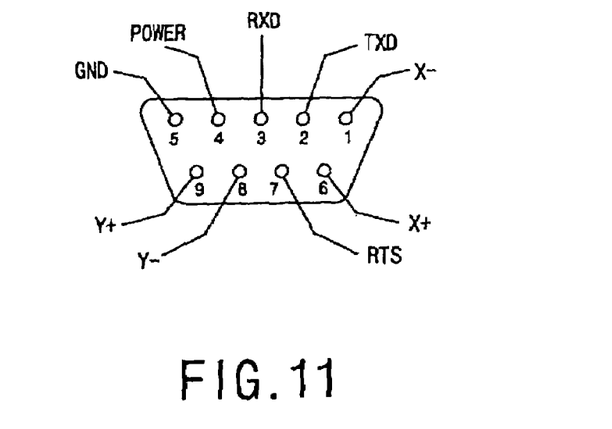
FIG. 11 is a front view of a connector of a digitizer according to another embodiment of the invention.

FIG. 11 shows the serial port for use in the digitizer according to the preferred embodiment of the present invention. As shown in FIG. 11, the inventive serial port comprises a pin 1 that transfers a x− signal, a pin 2 that transfers data, a pin 3 that receives data, a pin 4 that supplies a voltage, a pin 5 that connects with a ground, a pin 6 that transfers a x+ signal, a pin 7 that is a RTS signal, a pin 8 that transfers a y− signal and a pin 9 that transfers a y+ signal. In case that the I/O unit 1 is the serial port, the serial port may be connected with the liquid crystal display device when the digitizer is used or not be connected with the liquid crystal display device when the digitizer is not used.

As described hereinbefore, using the LCD device having the digitizer according to the preferred embodiment of the present invention, a production cost becomes low, and a compact liquid crystal display device can be achieved. Further, a display characteristics can be improved and a power consumption can be reduced.

While the invention has been particularly shown and described with reference to the preferred embodiments thereof, it will be understood by those skilled in the art that the foregoing and other changes in form and details may be made therein without departing from the spirit and scope of the invention. For example, the digitizers according to the preferred embodiment of the present invention can also be applied to infrared, acoustical, optical, capacitive, resistive and inductive type digitizers.

What is claimed is:

1. A liquid crystal display device used by a main system, comprising:
    a digitizer for producing signals indicative of a location by an external input and driven according to a first clock generated by a first clock generator;
    a liquid crystal display device for displaying a predetermined information according to the signal from the digitizer, the liquid crystal display device having first and second substrates with a liquid crystal layer interposed therebetween, and data and gate lines; and
    a printed circuit board having a drive circuit for controlling the digitizer and the liquid crystal display, wherein the drive circuit including:
        a power supply for supplying a voltage to the LCD panel and the digitizer;
        a clock generator for producing clock signals to drive the LCD device and the digitizer;
        an analog to digital (A/D) converter for converting analog signals to digital signals;
        a gamma circuit for correcting gamma characteristics of the LCD device;
        a first input/output (I/O) unit for conveying analog signals from the digitizer to the A/D converter and conveying signals from the controller to the digitizer;
        a second input/output (I/O) unit for transferring digital signals in the form of x-y coordinate values from the A/D converter to the main system;
        data and gate drivers driven by the clock generator; and
        a controller for controlling all components of the drive circuit.

2. The liquid crystal display device of claim 1, wherein the first I/O unit is one of a serial port, a parallel port, a universal serial bus (USB), and IEEE 1394 bus.

3. The liquid crystal display device of claim 1, wherein the digitizer includes:
    a first digitizer substrate having a rectangular shape over the upper substrate of the liquid crystal display device;
    a second digitizer substrate having a rectangular shape over the first digitizer substrate;
    a protective layer on the second digitizer substrate;
    first two digitizer electrodes disposed parallel to each other and along opposite edges of the first digitizer substrate;
    second two digitizer electrodes disposed parallel to each other and along opposite edges of the second digitizer substrate, the second two digitizer electrodes perpendicular to the first two digitizer electrodes;
    first and second drive circuit boards for driving the first and second digitizer electrodes, each boards disposed along neighboring edges of the first and second transparent conductive layers; and
    electric connections for connecting the first and second drive circuit boards to the corresponding digitizer electrodes, the electric connections having the same length.

4. A liquid crystal display device having a digitizer, comprising:
    a first frame;
    a liquid crystal panel supported by the first frame, the liquid crystal panel having a display region and a side wall portion;
    a digitizer located on the liquid crystal panel, the digitizer having a plurality of digitizer electrodes at a peripheral portion; and
    a second frame having a front surface with an opening region and a side wall portion, the front surface covering the digitizer electrodes and pressurizing the peripheral portion of the digitizer, the opening region at a location corresponding to the display region of the liquid crystal panel.

5. The liquid crystal display device of claim 4, further comprising,
    a printed circuit board having a drive circuit, the drive circuit driving the digitizer; and
    a first connection electrically connecting the printed circuit board with the digitizer, the first connection passing between the side wall portion of the liquid crystal panel and the side wall portion of the second frame.

6. The liquid crystal display device of claim 4, further comprising,
    a printed circuit board located on a back surface of the first frame, the printed circuit board having a controlling circuit for controlling both the liquid crystal panel and the digitizer.

7. A flat panel display device, comprising:
    a display panel having a display area and a peripheral area;
    a digitizer over the display panel, the digitizer having first and second sets of digitizer electrodes located at an area corresponding to the peripheral area of the display panel; and
    gate and data printed circuit boards connected to the display panel, wherein at least one of the gate and data printed circuit boards has a drive circuit, the first set of the digitizer electrodes is connected to the gate printed circuit board, and the second set of the digitizer electrodes is connected to the data printed circuit board.

8. The flat panel display device according to claim 7, wherein the first set of the digitizer electrodes is substantially perpendicular to the second set of the digitizer electrodes.

9. The flat panel display device according to claim 7, further includes a plurality of electrical connections for connecting the gate and data printed circuit boards to the corresponding digitizer electrodes, wherein the electrical connections have substantially the same length.

10. The flat panel display device according to claim 7, wherein the drive circuit includes a controller for controlling both the digitizer and the display panel according to a clock generator.

11. The flat panel display device according to claim 10, wherein the drive circuit further includes a power supply for supplying a voltage to the display panel and to the digitizer.

12. The flat panel display device according to claim 10, wherein the digitizer produces analog signals, and wherein the drive circuit includes an analog to digital (A/D) converter for converting the analog signals to digital signals.

13. The flat panel display device according to claim 12, wherein the drive circuit further includes a first input/output (I/O) unit for conveying analog signals to the A/D converter and for conveying signals from the controller to said digitizer.

14. The flat panel display device according to claim 13, wherein the first I/O unit is a serial port.

15. The flat panel display device according to claim 13, wherein the drive circuit further includes a second input/output (I/O) unit for transferring digital signals in the form of x-y coordinate values from said A/D converter to a main system.

16. The flat panel display device according to claim 11, the drive circuit further includes a gamma circuit for correcting gamma characteristics of said liquid crystal panel.

17. The flat panel display device according to claim 11, wherein the drive circuit further includes a data driver and a gate driver that are both driven by the clock generator.

18. The flat panel display device according to claim 7, further including a first frame and a second frame for securing the crystal panel and the digitizer.

19. The flat panel display device according to claim 18, wherein the second frame includes a front surface pressing the digitizer toward the display panel.

* * * * *